April 25, 1961

C. E. PARKER 2,981,399

APPARATUS FOR HANDLING RIGID SHEET MATERIAL

Filed Feb. 26, 1958

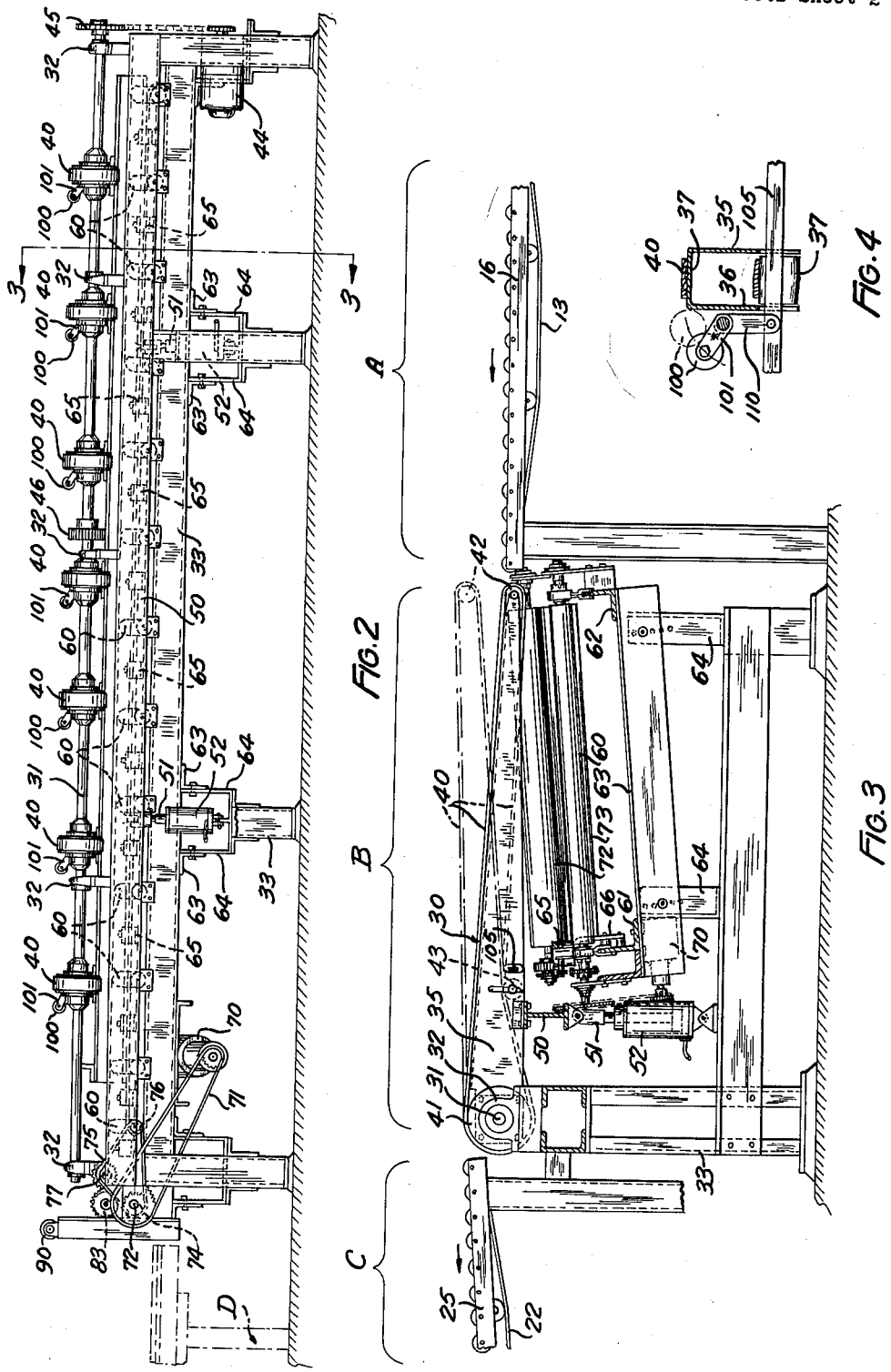

2,981,399

APPARATUS FOR HANDLING RIGID SHEET MATERIAL

Clarence E. Parker, deceased, late of Painesville, Ohio, by Frieda Parker, executrix, Painesville, Ohio, assignor to The Coe Manufacturing Company, Painesville, Ohio, a corporation of Ohio Filed Feb. 26, 1958, Ser. No. 717,733

4 Claims. (Cl. 198—31)

The present invention relates to apparatus for handling rectangular articles and more particularly to apparatus for removing an article, such as plasterboard or the like, from a continuous conveyor line without stopping the conveyor.

During the manufacture of many articles, for example plasterboards, it may be necessary or desirable to remove one or a plurality of the articles from a continuously moving conveyor line without stopping the conveyor line, and one of the principal objects of the present invention is the provision of a new and novel apparatus adapted to be inserted in a conveyor line and operable to remove a selected article or plurality of articles from the conveyor line.

Another object of the invention is the provision of a new and novel apparatus of the character referred to which will be simple in design, inexpensive to manufacture, reliable in operation, and which will handle the articles being manufactured without damage thereto even though they may be relatively fragile.

The invention resides in certain constructions, combinations and arrangement of parts, and further objects and advantages will be apparent to those skilled in the art from the following description of the preferred embodiment of the invention described with reference to the accompanying drawings forming a part of this specification, in which similar reference characters designate corresponding parts, and in which:

Fig. 2 is a side elevational view of a portion of the apparatus shown in Fig. 1;

Fig. 3 is an end elevational view of the apparatus shown in Fig. 2; and

Fig. 4 is a sectional view approximately on the line 4—4 of Fig. 1.

Figure 1:
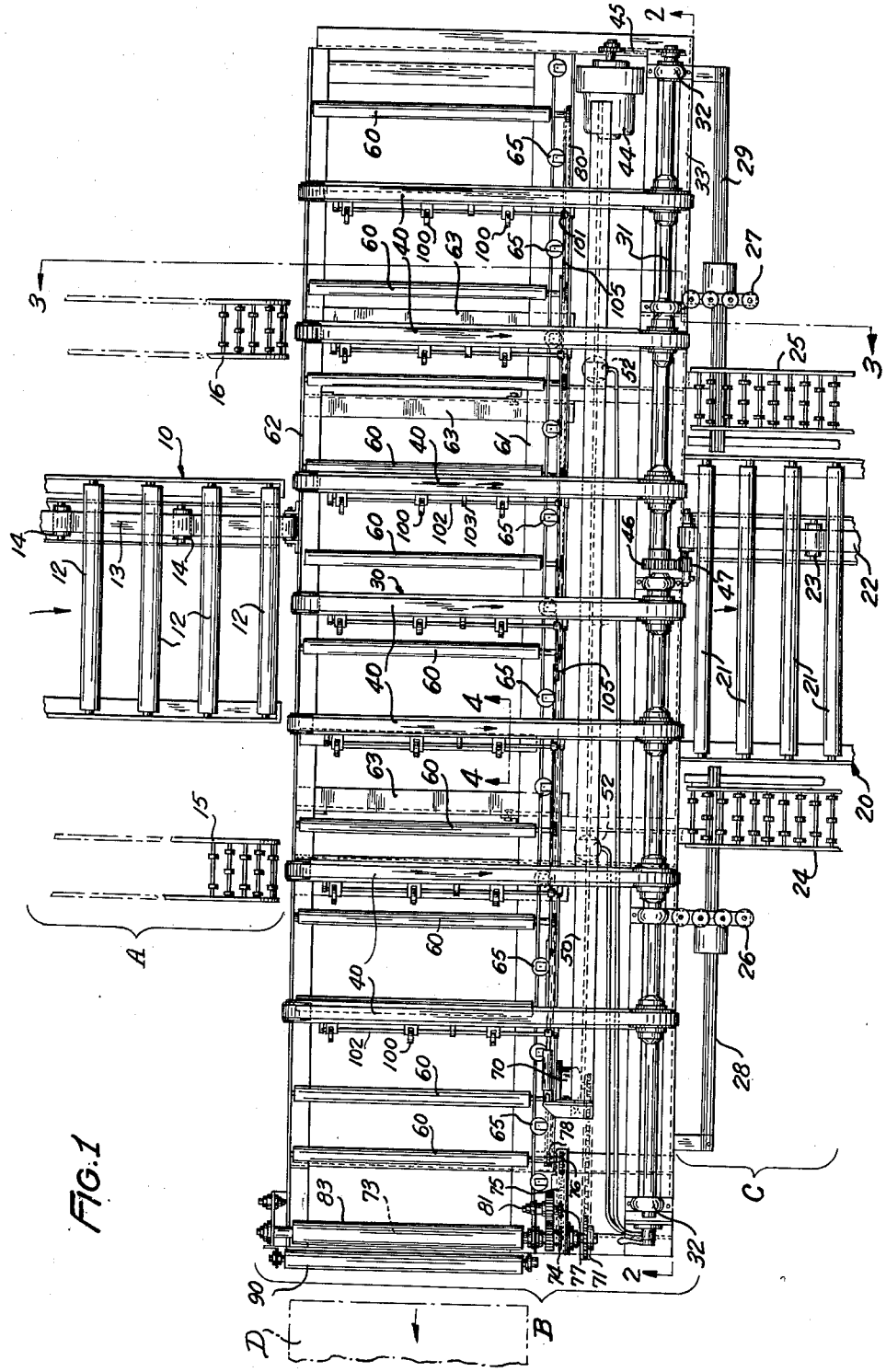
Fig. 1 is a plan view of a portion of a conveyor line comprising apparatus embodying the present invention.

The invention is herein shown and described as embodied in an apparatus insertable in a conveyor line, that is, between the discharge end of one conveyor section and the feed end of an adjacent conveyor section or other suitable pieces of equipment and operable to remove from the conveyor line a selected article or plurality of articles being carried there along in a more or less continuous stream or line and place the removed article or articles to one side of the conveyor line or make some other disposition of them without stopping the conveyor line or the movement of articles thereon.

Referring to the drawings, the reference character A designates a driven conveyor only the discharge end of which is shown. The conveyor A is designed to convey plasterboards of different lengths such as 4', 6', 8', 12', 16', etc. while positioned transversely of its path of movement and comprises a driven section 10 including a plurality of rolls 12 driven by an electric motor (not shown) through a belt 13 supported by belt pulleys 14 in such a manner that the upper side or outside of the top reach of the belt engages the lower portions of the rolls 12. In addition to the driven section 10, the conveyor A comprises a pair of idler roller sections 15, 16, one at either side of driven section 10 and adjustable toward and from the driven section 10 so as to better handle or support plasterboard of different lengths.

The reject equipment or apparatus designated B and which constitutes the present preferred embodiment of the present invention is positioned between the discharge end of the driven conveyor A and mechanism or apparatus C which in the embodiment shown is designated to feed plasterboard to a machine which arranges the plasterboard in bundles of a plurality of boards, but which may be a driven conveyor similar to the conveyor A or some other suitable apparatus or equipment.

The feed apparatus or section C, like the driven conveyor section A, per se, forms no part of the present invention and is not shown in its entirety and will not be described in detail. Suffice it to say that it comprises a driven roll section 20 somewhat similar to the driven roll section 10, the rolls 21 of which are driven by a belt 22 carried by pulleys 23 and having the upper side of its top reach in contact with the undersides of the rolls 21. Like the driven conveyor A, the apparatus C comprises idler roller sections 24, 25 at opposite sides of the driven roll section 20 and adjustable relative thereto so as to better support and convey plasterboards of different lengths. The feed apparatus C shown also comprises two sets of four aligning rollers 26, 27 adjustably carried by the bars 28, 29 fixed to the frame of the reject apparatus B and which bars support the ends of the idler roller sections 22, 23 adjacent to the reject apparatus.

The reject apparatus B comprises a plurality of levers 30, in the present instance seven, pivotally connected at their left-hand ends as viewed in Figs. 1 and 3 to a transversely extending shaft 31 rotatably supported in suitable brackets 32 on a built up frame 33. Each of the levers 30 comprise two spaced vertical side members 35, 36, see Figs. 3 and 4, pivotally connected to the shaft 31 and connected at their upper edges to a generally horizontal plate-like member 37 extending from a point adjacent to the free or right-hand ends of the levers to a point adjacent to their pivoted ends. Each lever 30 carries a belt 40 looped about a driving pulley 41 located between the side plates 35, 36 of the lever and keyed to the shaft 31 and an idler pulley 42 rotatably supported in the free or right-hand ends of the lever. The upper reach of the belt 40 is located above the plate 37 of the lever and the lower reach extends within the lever and is held above the lower edges of the side plates 35, 36 by an idler pulley 43 rotatably supported between the side plates 35, 36 at a point approximately ¼ of the length of the lever from the pivoted end thereof.

The shaft 31 and in turn the belts 40 are continuously driven by an electric motor 44 supported by the right-hand end of the frame 33 as viewed in Figs. 1 and 2 and operatively connected to the shaft 33 by a sprocket chain drive designated generally as 45. In the embodiment shown the belt 22 and in turn the rolls 21 of the feed apparatus C are driven from the shaft 31 through a gear 46 fixed to the shaft 31 and continuously enmeshed with a pinion 47 fixed to a short shaft which carries one of the belt pulleys 23 for the belt 22.

The upper sides of the levers 30 and, in turn, the upper reaches of the belts 40 are held in the position shown in full lines in Fig. 3; that is, in substantial horizontal alignment with the discharge end of the driven conveyor section A by a transversely extending I-beam 50 fixedly connected to the lower edges of the side plates 35, 36 of the respective levers. The lower flange of the I-beam 50 is pivotally connected to the upper end of two piston rods 51 of vertically positioned pressure fluid actuated reciprocating type motors 52, the cylinders of which are pivotally connected to the frame 33 directly beneath the I-beam 50. When the fluid pressure motors 52 are actuated they raise the right-hand or free ends of the arms 30 above the path of travel of the plasterboards along the conveyor A and plasterboards travelling along the conveyor A are then discharged by the conveyor onto a plurality of driven rolls 60 located below the arms 30 and having their axes of rotation extending lengthwise of the direction of travel of the plasterboards along the conveyor A.

The rolls 60 are rotatably supported in suitable bearing brackets connected to the upstanding flanges or angle irons 61, 62 resting upon and connected to a plurality of angle irons 63 which are in turn adjustably connected to upstanding members 64 forming a part of the frame 33. The angle irons 63 are preferably connected to the members 64 in such a manner that the rolls 60 are inclined downwardly toward the left as viewed in Fig. 3. The rollers 60 are preferably made of metal and as the plasterboards slide toward the left-hand ends thereof, as viewed in Fig. 3, the leading edge of the board or boards, as the case may be, engage against a plurality of rubber covered wheels or rollers 65 supported for rotation about axes generally normal to the plane of the rolls 60 by brackets 66 connected to the angle irons 61.

The rolls 60 are driven, during operation of the apparatus, in a direction to move a plasterboard or boards thereon toward the left as viewed in Figs. 1 and 2 by an electric motor 70 connected to the underside of the frame 33 and having its driving shaft connected by a sprocket chain drive 71 to a shaft 72 projecting from the near end of a bottom pinch roll 73 rotatably supported in suitable bearing brackets in the left-hand end on the frame 33 as viewed in the aforementioned figures. In addition to driving the shaft 72 and the roll 73, the sprocket chain drive 71 drives a sprocket wheel 74 by a sprocket chain 75 looped about the sprocket wheel 74 and two driven sprocket wheels 76, 77. The driven sprocket 76 is keyed to the projecting end of the shaft which carries the left-hand roll 60 and which shaft is provided with a sprocket wheel 78 as are all of the shafts of the rolls 60. The sprocket wheels 78 of the respective rolls 60 are connected by a sprocket chain 80 and are all driven in unison from the electric motor 70. The driven sprocket 77 is fixed to the end of a short shaft 81 rotatably supported in a suitable bearing bracket, connected to the upstanding flange of the angle iron 61. In addition to supporting the rear end of the shaft 81 as viewed in Fig. 1, the bracket 82 supports the rear end of an upper pinch roll 83 directly above the pinch roll 73 previously referred to. The near end of the roll 83 is rotatably supported in a bearing bracket connected to the angle iron 61 and is adapted to be driven in timed relation to the roll 73 by a pair of gears 84, 85 keyed to the shaft 81 and the projecting shaft of the roll 83 at the near side of the apparatus.

The construction just described is such that a plasterboard or boards discharged by the driven conveyor A onto the rolls 60 will be moved toward the left by the rotation of the rolls and ejected by the pinch rolls 73, 83 at the left-hand end of the machine onto some suitable apparatus, such as, a third conveyor or a storage elevator D, the receiving platform of which elevator is adapted to be stepped downwardly as plasterboards are deposited thereon.

If it is desired to return a plasterboard deposited on the elevator D to the conveyor line, the operator lifts the board or the end thereof adjacent to the apparatus B from the conveyor and places it upon an idler roll 90 rotatably supported by suitable bearing brackets at the left-hand end of the frame C and located above the level of the arms 30 regardless of whether they are in their up or down positions. The leading end of the plasterboard is then pushed by the operator over the arms 30 and in order to facilitate its movement crosswise of the arms, each of the arms 30 is provided with a plurality of wheels or rollers 100 rotatably supported in the free ends of arms 101 keyed to a shaft 102 rotatably supported in suitable brackets 103 fixed to the left-hand side of each of the arms 30 as viewed in Fig. 1. The arms 101 normally project from the shafts 102 at angles of approximately 45° but may be rotated in a vertical position to raise the top of the rollers 100 above the level of the arms 30 with which they are associated by a reciprocating bar or rod 105 slidably supported in the arms 30 and adapted to be reciprocated by a pressure fluid actuated motor, the piston of which is operatively connected to one end of rod 105 and the cylinder of which is connected to one of the arms 30. The rod 105 is connected to the respective shafts 102 of the various arms 30 by links 110 fixedly connected to the shafts 102 and pivotally connected to the rod 105. The construction just described is such that the operator may raise the rollers 100 above the level of the arms 30 when he wishes to slide a plasterboard or boards onto the arms 30. After the board is in position above the arms 30, the rollers can be lowered and the board transferred to the belts 40 whereupon it continues along the conveyor line.

The operation of the motors 52 and 106 is under the control of suitable valves, not shown, located at an operator's position adjacent to the machine.

While the preferred embodiment of the invention has been described in considerable detail, the invention is not limited to the particular construction shown and it is the intention to cover hereby all adaptations, modifications, and uses thereof which come within the practice of those skilled in the art to which it relates and the scope of the appended claims.

Having thus described my invention, what I claim is:

1. In a material-handling apparatus of the character referred to a frame, a plurality of generally horizontal parallel lever-like members, means pivotally connecting said members to said frame for oscillation about a generally horizontal, axis, each of said members having a conveyor belt connected thereto with its upper reach above the upper side of the respective member with which it is associated, means for driving said belts in a direction such that their upper reaches travel toward the pivoted ends of said members, each of said lever members comprising a plurality of rollers spaced lengthwise therealong and supported for rotation about axes parallel to the length thereof, means for supporting said rollers for movement between positions above and below the upper reaches of said belts, means for moving said rollers from one of said positions to the other, and means underneath said members and connected thereto adjacent to their pivoted ends for oscillating said members.

2. In a material-handling apparatus of the character referred to a frame, a plurality of generally horizontal parallel lever-like members, means pivotally connecting said members to said frame for oscillation about a generally horizontal, axis, each of said members having a conveyor belt connected thereto with its upper reach above the upper side of the respective member with which it is associated, means for driving said belts in a direction such that their upper reaches travel toward the pivoted ends of said members, each of said lever members comprising a plurality of rollers spaced lengthwise therealong and supported for rotation about axes parallel to the length thereof, means for supporting said rollers for movement between positions above and below the upper reaches of said belts, means for moving said rollers from one of said positions to the other, means underneath said members and connected thereto adjacent to their pivoted ends for oscillating said members, and conveyor means located below said members.

3. In a material-handling apparatus of the character referred to a frame, a plurality of generally horizontal parallel lever-like members, means pivotally connecting said members to said frame for oscillation about a generally horizontal, axis, each of said members having a conveyor belt connected thereto with its upper reach above the upper side of the respective member with which it is associated, means for driving said belts in a direction such that their upper reaches travel toward the pivoted ends of said members, each of said lever members comprising a plurality of rollers spaced lengthwise therealong and supported for rotation about axes parallel to the length thereof, means for supporting said rollers for movement between positions above and below the upper reaches of said belts, means for moving said rollers from one of said positions to the other, means underneath said members and connected thereto adjacent to their pivoted ends for oscillating said members, conveyor means comprising a plurality of generally horizontal rollers located below said members, means for rotatably supporting said rollers in said frame with their axes generally parallel with the length of said members and inclined downwardly in the direction of movement of the upper reaches of said belts, means for driving said rollers, and a plurality of generally vertical rollers carried by said frame adjacent to the lower ends of said generally horizontal rollers.

4. In a material handling apparatus having first and second unidirectional conveyor means positioned in tandem relationship with the entrance end of the second spaced from the discharge end of the first, a plurality of generally horizontal parallel conveyor belts interposed between the discharge end of the first conveyor means and the entrance end of the second conveyor means and extending from the first to the second conveyor means in the general direction in which they are adapted to move material, movable frame means within and supporting said conveyor belts, stationary frame means located wholly below the level of the upper reaches of said conveyor belts, means for pivotally connecting to said stationary frame means the end of said movable frame means adjacent to the entrance end of the second conveyor means for oscillation about a general horizontal common axis, means for driving said belts in the direction to move the upper reaches thereof towards the pivoted end of said movable frame means, a third conveyor means located underneath said conveyor belts, and means underneath said movable frame means and connected thereto adjacent to said pivoted end thereof for oscillating said movable frame means about said common axis to move the ends of said conveyor belts remote from said axis between first positions in which they are adapted to receive material discharged by the first conveyor means and second positions in which they are above the first conveyor means whereby when in said first position material discharged by the first conveyor means is conveyed by said conveyor belts to the second conveyor means and when in said second position material discharged from the first conveyor means passes underneath said conveyor belts and onto said third conveyor means.

References Cited in the file of this patent

UNITED STATES PATENTS

| | | |
|---|---|---|
| 744,874 | Neeland | Nov. 24, 1903 |
| 1,258,351 | Martin | Mar. 5, 1918 |
| 1,620,014 | Evans | Mar. 8, 1927 |
| 1,998,968 | Rosin | Apr. 23, 1935 |
| 2,478,610 | Uschmann et al. | Aug. 9, 1949 |
| 2,846,089 | Stewart | Aug. 5, 1958 |